(12) United States Patent
Kummerfeld et al.

(10) Patent No.: US 6,659,415 B2
(45) Date of Patent: Dec. 9, 2003

(54) CEILING MOUNT FOR A MEDICAL LIGHT

(75) Inventors: Ryszard Kummerfeld, Travemünde (DE); Lothar Petermann, Bad Schwartau (DE)

(73) Assignee: Dräger Medical AG & Co. KGaA, Lübeck (DE)

( * ) Notice: Subject to any disclaimer, the term of this patent is extended or adjusted under 35 U.S.C. 154(b) by 0 days.

(21) Appl. No.: 10/079,105

(22) Filed: Feb. 19, 2002

(65) Prior Publication Data

US 2002/0139913 A1 Oct. 3, 2002

(30) Foreign Application Priority Data

Apr. 3, 2001 (DE) ................................ 101 16 495

(51) Int. Cl.[7] .............................................. B42F 13/00
(52) U.S. Cl. ........................................ 248/343; 248/327
(58) Field of Search ............................... 248/343, 324, 248/317, 327, 320

(56) References Cited

U.S. PATENT DOCUMENTS

| 3,164,355 | A | * | 1/1965 | Seitz et al. ................ 248/324 |
| 3,945,597 | A | * | 3/1976 | Klein ......................... 248/327 |
| 5,261,645 | A | * | 11/1993 | Huffman .................. 248/277.1 |
| 5,351,925 | A | * | 10/1994 | Druais ..................... 248/122.1 |
| 5,379,977 | A | * | 1/1995 | Ronn et al. .............. 248/277.1 |
| 5,490,652 | A | * | 2/1996 | Martin ..................... 248/282.1 |
| 5,618,090 | A | * | 4/1997 | Montague et al. ............ 211/26 |
| 6,095,468 | A | * | 8/2000 | Chirico et al. ........... 248/125.7 |
| 6,213,481 | B1 | * | 4/2001 | Marchese et al. ........ 248/282.1 |
| 6,431,515 | B1 | * | 8/2002 | Gampe et al. ............. 248/324 |
| 2002/0074472 | A1 | * | 6/2002 | Gaida et al. ............. 248/276.1 |

FOREIGN PATENT DOCUMENTS

EP      0 548 589      6/1993

* cited by examiner

*Primary Examiner*—Leslie A. Braun
*Assistant Examiner*—A. Joseph Wujciak, III
(74) *Attorney, Agent, or Firm*—McGlew and Tuttle, P.C.

(57) ABSTRACT

A ceiling mount for a medical light shall positions a light body at different points of a treatment table in a simple manner. A bracket system is fastened to a lifting arm that can be actuated by a motor and which has at its free end a bracket guided in parallel for the mounting flange of the bracket system.

9 Claims, 3 Drawing Sheets

US 6,659,415 B2

CEILING MOUNT FOR A MEDICAL LIGHT

FIELD OF THE INVENTION

The present invention pertains to a ceiling mount for a medical light as well as a system and process using a ceiling mount and a medical light.

BACKGROUND OF THE INVENTION

Medical lights are usually arranged on the ceiling of a medical treatment room by means of a multiply articulated arm system. The light or lights can be pivoted by means of the multiply articulated arm system both in height and laterally into a desired position.

A medical light of this type has become known from EP 548 589 B1. The suspension of the light body comprises horizontal arms or arms sloped to the horizontal, which are connected to one another by individual hinges. The light body can thus be positioned at a suitable point above a medical treatment table.

The drawback of the prior-art light is that due to the length of the arms and the number of hinges, it can be pivoted only over a limited range within the treatment room. In case of the usual fastening of the multiply articulated arm system on the ceiling, only positions of the light body above the treatment table can be normally obtained. For certain forms of treatment, e.g., stereotactic procedures, it must be possible to illuminate a patient from any position. This cannot be achieved with prior-art medical lights designed for mounting on the ceiling.

SUMMARY AND OBJECTS OF THE INVENTION

The basic object of the present invention is to improve a ceiling mount for a medical light such that the light body can be positioned on all sides of the medical treatment table in a simple manner.

According to the invention, a ceiling mount for a medical light is provided with a bracket system connected by hinges with a mounting flange and with a light body. A lifting arm is provided that can be actuated by a motor on a ceiling bracket. A lifting arm has at its free end a bracket guided in parallel for a mounting flange.

The advantage of the present invention is essentially that the mounting flange of the bracket system is fastened at the end of a lifting arm pivotable by means of a motor around an axis and the bracket system can be prepositioned as a result within the medical treatment room such that the final setting of the light body can be performed from the position of the lifting arm. For fastening the bracket system, the lifting arm has a bracket at its end. This bracket is displaced in parallel to itself in the different positions that the lifting arm can assume, so that the bracket system located thereon can also be displaced in parallel to itself. Due to the motor-actuated lifting arm, which can also be blocked by a drive motor in its preselected position, the mounting flange of the bracket system has a fixed reference point, from which the desired position of the light body can be set. The combination of a lifting arm which can be pivoted by means of a motor and can also be blocked with a freely positionable bracket system also offers the advantage that no measures, going beyond the usual amount need to be taken for balancing the weight within the bracket system, are needed. As a result a number of commercially available bracket systems designed for fastening on a ceiling can be used. Even though lifting arms pivotable by means of a motor have generally been known from the state of the art, these had not been used for fastening treatment and monitoring devices before. The combination of a lifting arm that can be pivoted by means of a motor with a bracket system for a light body opens up the possibility of obtaining a new field of use for pivotable light bodies with existing components. This possibility of combination, which is surprising for the person skilled in the art, has not been hitherto recognized, even though it is favorable in terms of costs and can be embodied without appreciable design modification efforts.

The bracket system advantageously comprises a horizontal arm with a mounting flange connected to it in an articulated manner, a vertical arm and a pivoting arm. A first hinge is arranged between the horizontal arm and the vertical arm and a second hinge is arranged between the vertical arm and the pivoting arm. A first pivot axis of the first hinge extends flush with the first vertical arm and a second pivot axis of the second hinge is directed at right angles to the first pivot axis.

An exemplary embodiment of the present invention is shown in the drawing and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
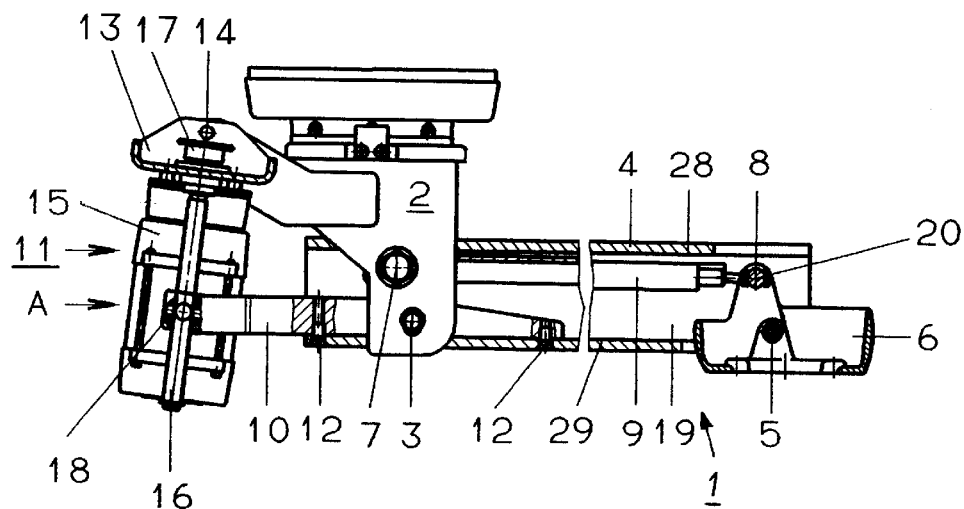
FIG. 1 is a side view of a longitudinal section of a motor-adjustable ceiling-mounted pivoting system according to the invention.

Referring to the drawings in particular, FIG. 1 shows the side view of the longitudinal section of a ceiling-mounted pivoting system 1 with a ceiling bracket 2 and a lifting arm 4 pivotable via a first bearing 3 in relation to the ceiling bracket 2. A bracket 6 is fastened to the free end of the lifting arm 4 by means of a second bearing 5. A profiled strut 9 extending within the lifting arm 4 is fastened to the ceiling bracket 2 via a third bearing 7 and to the bracket 6 via a fourth bearing 8. A pivoting lever 10, which is used for the height adjustment of the lifting arm 4 in conjunction with a lifting drive 11, is connected to the lifting arm 4 and to the first bearing 3 The pivoting lever 10 is arranged an the lifting arm 4 by means of fastening screws 12. The lifting drive 11 comprises a bracket 13, which is arranged on the ceiling bracket 2 pivotably by means of a hinge 14. A drive motor 15 and a spindle 16 with a spindle bearing 17 are located on the bracket 13. Via a spindle nut 18 and a coupling bearing 26, which together form a coupling element between the spindle 16 and the pivoting lever 10, the pivoting lever 10 is connected to the spindle 16 in an articulated manner. The profiled strut 9 within the lifting arm 4 is used essentially for the parallel guiding of the bracket 6. The profiled strut 9 is U-shaped, corresponding to the square cross-sectional area of the lifting arm 4, and is located in the vicinity of an upper inner wall 28 of the lifting arm 4. Due to the parallelogram-like arrangement of the bearings 3, 5, 7, 8, a hollow space 19, which can be used for accommodating supply lines, not shown in FIG. 1, is obtained within the lifting arm 4 between the profiled strut 9 and a lower inner wall 29 of the lifting arm 4. Because of the U-shaped contour of the profiled strut 9 and the shell-like arrangement of the profiled strut 9 within the lifting arm 4, the inner cross-sectional area of the lifting arm 4 is not substantially reduced by the profiled strut 9. An adjusting screw 20 for the parallel alignment of the bracket 6, with which the effective length of the profiled strut 9 can be essentially changed, is arranged at the fourth bearing 8.

Figure 2:
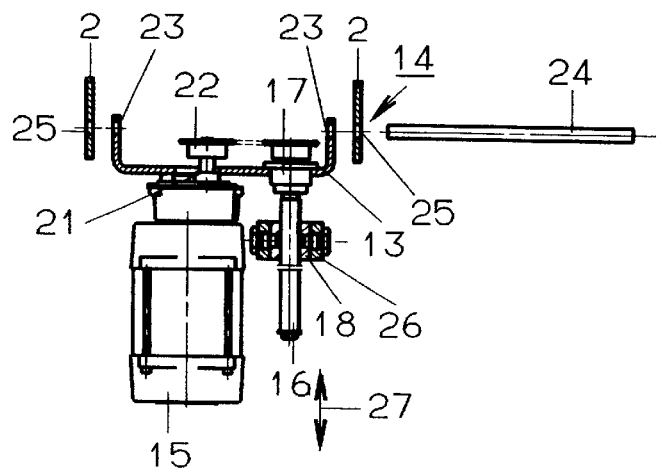
FIG. 2 is a detail of the drive of the ceiling-mounted pivoting system in view A according to FIG. 1.

FIG. 2 shows the lifting drive 11 in view A according to FIG. 1. Identical components are designated with the same reference numbers as in FIG. 1. The drive shaft 21 of the drive motor 15 is connected to the spindle 16 via a chain drive 22. The hinge 14 comprises hinge bushings 23 at the bracket 13 and bushings 25 at the ceiling bracket 2, the ceiling bracket 2 being shown only partly in FIG. 2. A hinge pin 24 is passed through the bushings 23, 25.

If the position of the lifting arm is to be changed during the operation, the spindle 16 is rotated with the drive motor 15 and the coupling element 18 moves in the direction of arrow 27. The spindle nut 18 on the spindle 16 now performs a purely linear translatory movement, while the coupling bearing 26 moves in a circular path in relation to the first bearing 3. With the drive motor 15 switched off, the spindle nut 18 on the spindle 16 is blocked, so that the lifting arm 4 remains in its position.

Figure 3:
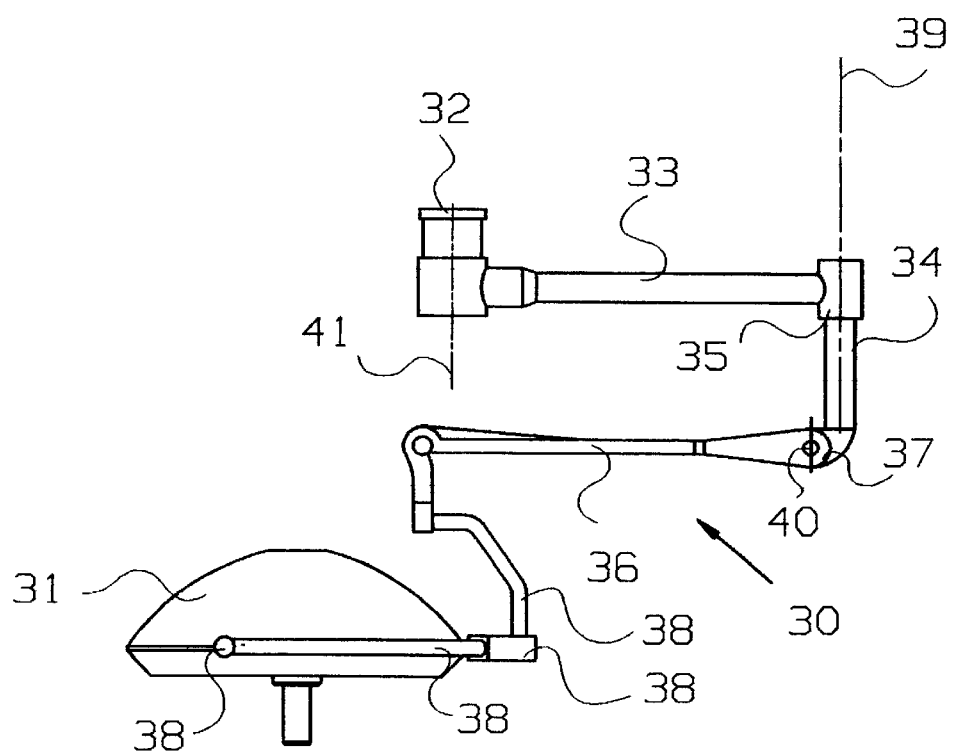
FIG. 3 is a light body on a bracket system according to the invention.

FIG. 3 illustrates a bracket system 30 for a light body 31, which comprises a horizontal arm 33 connected to a mounting flange 32 by means of a flange, a vertical arm 34, a first hinge 35 between the horizontal arm 33 and the vertical arm 34, a pivoting arm 36, a second hinge 37 between the vertical arm 34 and the pivoting arm 36, as well as an articulated arm connection 38 between the pivoting arm 36 and the light body 31. The first hinge 35 makes possible the rotation of the vertical arm 34 in relation to the horizontal arm 33 around a first pivot axis 39 extending flush with the vertical arm 34. The movement of the pivot arm 36 takes place, by contrast, around the second pivot axis 40, which extends at right angles to the first pivot axis 39. The horizontal arm 33 can be rotated in relation to the mounting flange 32 around a third pivot axis 41, which extends in parallel to the first pivot axis 39.

Figure 4:
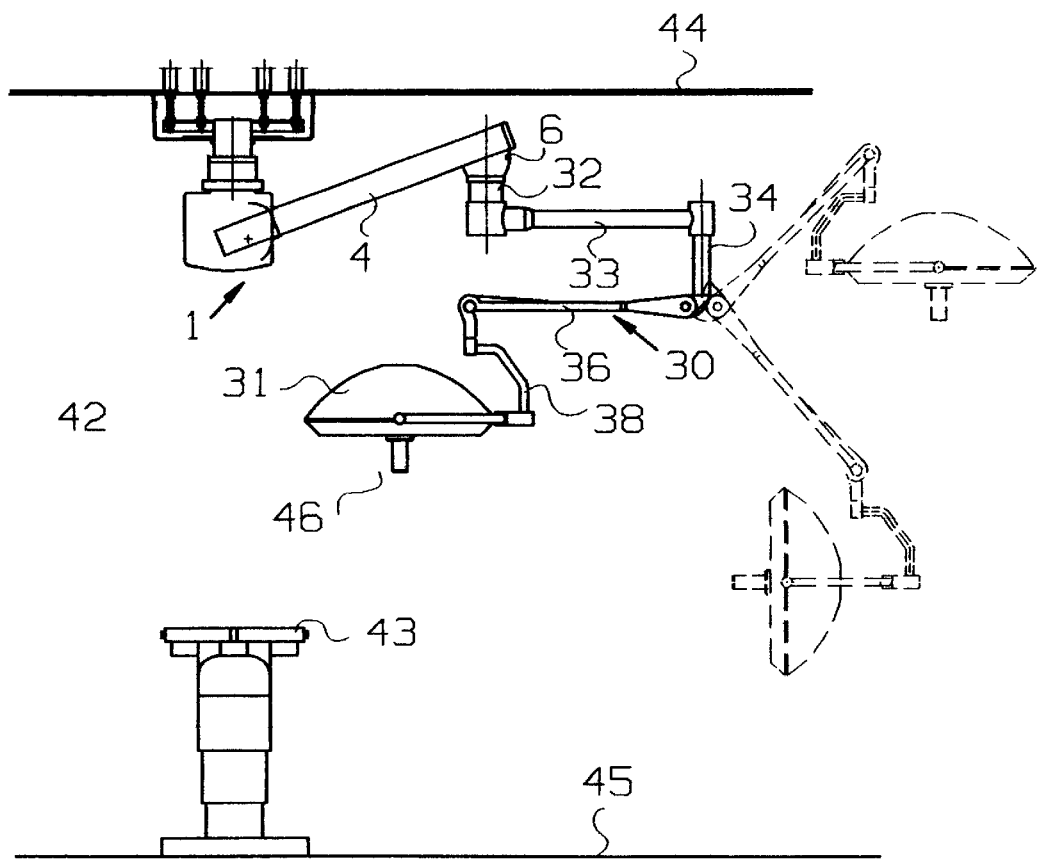
FIG. 4 is a ceiling mount according to the present invention in a medical treatment room.

FIG. 4 illustrates in combination the ceiling-mounted pivoting system 1 with the lifting arm 4 and the bracket system 30 with the light body 31 in a medical treatment room 42. Identical components are designated by the same reference numbers as in FIGS. 1 through 3. Various positions of the light body 31 in relation to a treatment table 43 are indicated in FIG. 4 by broken lines. The lifting arm 4 is pivoted out toward the ceiling 44. If, e.g., a treatment area below the treatment table 43 is to be illuminated, the lifting arm is pivoted downward in the direction of the floor 45, and the bracket 6 and the mounting flange 32 of the bracket system 30 move on a semicircular arc 46. When a corresponding working position has been reached for the bracket system 30 with the lifting arm 4, the lifting arm is blocked and the bracket system 30 can then be brought into the final position together with the light body 31.

While specific embodiments of the invention have been shown and described in detail to illustrate the application of the principles of the invention, it will be understood that the invention may be embodied otherwise without departing from such principles.

What is claimed is:

1. A medical light ceiling mount, comprising:

a bracket system connected by hinges with a mounting flange and with a light body;

a motor on a ceiling bracket; and a lifting arm that can be actuated by the motor on the ceiling bracket, the lifting arm having a free end with a bracket guided in parallel relative to the ceiling, the bracket for connection to the mounting flange.

2. A ceiling mount in accordance with claim 1, wherein the bracket system comprises a horizontal arm with the mounting flange connected thereto in an articulated manner, a vertical arm, a pivoting arm, a first hinge between the horizontal arm and the vertical arm and a second hinge between the vertical arm and the pivoting arm, wherein a first pivot axis of the first hinge extends flush with the vertical arm, and a second pivot axis of the second hinge is directed at right angles to the first pivot axis.

3. A coiling mount process in accordance with claim 2, wherein the bracket system comprises a horizontal arm with the mounting flange connected thereto in an articulated manner, a vertical arm, a pivoting arm, a first hinge between the horizontal arm and the vertical arm and a second hinge between the vertical arm and the pivoting arm, wherein a first pivot axis of the first hinge extends flush with the vertical arm, and a second pivot axis of the second hinge is directed at right angles to the first pivot axis.

4. A ceiling mount system comprising:

a ceiling bracket connectable to a ceiling;

a lifting member pivotally connected to said ceiling bracket;

a guided bracket pivotally connected to said lifting member, said guided bracket having an angular orientation with respect to said ceiling bracket;

a linkage system having a first end connected to said guided bracket, and having a second end;

a light body connected to said second end of said linkage system;

a motor connected to said ceiling bracket and said lifting member, said motor pivoting said lifting member with respect to said ceiling bracket, said lifting member being connected to said ceiling bracket and said guide bracket to maintain said angular orientation of said guide bracket substantially constant during pivoting of said lifting member.

5. A system in accordance with claim 4, wherein:

said lifting member includes first and second arms, each connected to said ceiling bracket and said guided bracket with bearings, said bearings being arranged on said ceiling and guided bracket to maintain said angular orientation of said guide bracket substantially constant during pivoting of said lifting member.

6. A system in accordance with claim 5, wherein:

said second lifting arm is arranged inside said first lifting arm.

7. A system in accordance with claim 6, wherein
said second lifting arm has a U-shaped cross section opening towards a radial inside of said first lifting arm.

8. A system in accordance with claim 7, wherein:
said first lifting arm has a substantially square cross section.

9. A system in accordance with claim 4, wherein:
said linkage system includes a substantially horizontal arm pivotally connected to said guided bracket, a substantially vertical arm with a first hinge between said horizontal arm and said vertical arm, said linkage system includes a pivoting arm with a second hinge between said vertical arm and said pivoting arm, wherein a first pivot axis of said first binge extends flush with said vertical arm, and a second pivot axis of said second binge is directed at right angles to said first pivot axis.

* * * * *